Patented May 18, 1954

2,678,943

UNITED STATES PATENT OFFICE 2,678,943

STABILIZATION OF UNSATURATED NITRILES

Keith M. Taylor, La Marque, Tex., assignor to Monsanto Chemical Company, St. Louis, Mo., a corporation of Delaware No Drawing. Application June 20, 1952, Serial No. 294,706

14 Claims. (Cl. 260—465.9)

This invention relates to the stabilization of unsaturated nitriles. More specifically, this invention relates to the inhibition of the polymerization of alpha, beta-unsaturated nitriles.

The unsaturated nitriles, particularly the alpha, beta-unsaturated nitriles, are extremely useful chemical compounds. Considerable quantities of these materials are used for the preparation of synthetic rubbers and various types of synthetic resins. These materials, however, possess a characteristic which all too frequently hampers not only their utility, but also the purification techinques commonly employed in their preparation. All of these materials exhibit a tendency to polymerize when subjected to periods of storage and/or to elevated temperatures. Such polymerization results in a darkening of the unsaturated nitrile monomer and ultimately in the formation of solid polymer contaminant.

Since most applications or uses of the unsaturated nitriles require high-purity products, these polymerization characteristics present a serious problem in the preparation and storage of finished grade material. Furthermore, since distillation at elevated temperatures is the commonly used purification technique, purification is hampered by solid polymer formation which accumulates in the equipment, ultimately plugging the column. To add to this latter problem, impurities present in crude unsaturated nitriles are frequently of the type which accelerate polymerization. For example, acrylonitrile containing small quantities of acetaldehyde exhibits a greater tendency to polymerize than does relatively pure acrylonitrile.

Attempts to eliminate this problem have been made in the past by the addition of inhibitors which retard or prevent the polymerization of unsaturated nitriles. Unfortunately, the inhibitors heretofore used, while exhibiting some inhibitory effects, have not proven to be completely satisfactory. To be of practical utility, the inhibitor must not impart any undesirable color to the unsaturated nitrile, be sufficiently inhibitory to manifest its effect over extended periods of storage, inhibit polymer formation at elevated temperatures to permit utility in distillation purification techniques, and be readily separable from the unsaturated nitrile or inert in subsequent reactions of the inhibited product. The inhibitors heretofore used have not satisfied all of these requirements.

It is an object of this invention to provide an improved method for preventing or inhibiting the polymerization of unsaturated nitriles. It is a further object of this invention to provide an improved method for preventing the polymerization of unsaturated nitriles by the addition of an inhibitor which does not possess the deficiencies exhibited by these inhibitors heretofore used. A still further object of this invention is to provide novel stabilized compositions comprising an unsaturated nitrile and an added polymerization inhibitor, which then can be subjected to extended periods of storage, or purification distillations at elevated temperatures without exhibiting any significant evidence of polymer formation. Further objects of this invention will become apparent from the description which follows.

It has been discovered that the polymerization of unsaturated nitriles, particularly the alpha, beta-unsaturated nitriles, can be prevented or inhibited by mixing therewith a minor amount of a compound having a formula

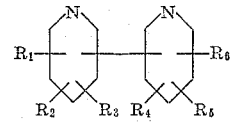

wherein $R_1$, $R_2$, $R_3$, $R_4$, $R_5$, and $R_6$ are selected from the group consisting of hydrogen and alkyl radicals containing from one to eight carbon atoms. For convenience these compounds will hereafter be referred to as dipyridyl derivatives. It has been found that a composition comprising an unsaturated nitrile and a minor amount of a dipyridyl derivative will not exhibit any significant polymer formation on prolonged periods of storage, or when subjected to the temperatures commonly encountered during purification distillation techniques.

The following examples illustrate, but do not limit, this invention.

Example I

A sealed test tube containing a mixture of 16 g. of acrylonitrile and 1 g. of acetaldehyde as a polymerization accelerator is placed in an oven maintained at a temperature of 115° C. After about 1.5 hours, the mixture is solidified, indicating substantially complete polymerization.

Example II

A sealed test tube containing a mixture of 16 g. of acrylonitrile, 1 g. of acetaldehyde and .002 g. of $\alpha,\alpha'$-dipyridyl is placed in an oven maintained at 115° C. No significant polymer formation is evident for two days.

Example III

Sealed test tubes containing 16 g. of acrylonitrile, methacrylonitrile, crotonitrile, $\alpha$-ethyl acrylonitrile, and $\beta$-hexyl acrylonitrile respectively, and each containing 1 g. of acetaldehyde as a polymerization accelerator and 0.005 g. of $\beta,\beta'$-dipyridyl as a polymerization inhibitor, are placed in an oven maintained at 115° C. No significant polymer formation is evident after extended periods of storage at this temperature.

Example IV

Sealed test tubes containing 16 g. of acrylonitrile, $\alpha,\beta$-dimethyl acrylonitrile, methacrylonitrile, $\alpha$-butyl acrylonitrile and $\beta$-(2-chloroethyl)

acrylonitrile respectively, each containing 1 g. of acetaldehyde as a polymerization accelerator and 0.004 g. of α,α'-dicollidyl as a polymerization inhibitor are maintained at 115° C. for an extended period of time. No significant polymer formation is evident.

*Example V*

The procedure set forth in Example III is repeated, using 16 g. of acrylonitrile, α,β-dimethyl acrylonitrile, methacrylonitrile and α-furfuryl acrylonitrile respectively, each containing 1 g. of acetaldehyde and 0.01 g. of 2,3,4,2',3',4'-hexamethyl-5,5'dipyridyl. No significant polymer formation is observed.

*Example VI*

The procedure set forth in Example III is repeated, using 16 g. of acrylonitrile, β-ethyl acrylonitrile, α-phenyl acrylonitrile, α-naphthyl acrylonitrile, α-(2-chlorobutyl) acrylonitrile and α-(4-hydroxyphenyl) acrylonitrile respectively, each containing 1 g. of acetaldehyde and 0.05 g. of 2,2'-dimethyl-4,4'-diethyl-5,5'-dipyridyl. No significant polymer formation is observed.

*Example VII*

Samples of acrylonitrile, methacrylonitrile and crotonitrile are stabilized by mixing therewith 1000 parts by weight of α,α'-dipyridyl per million parts by weight of the nitrile. After extended periods of storage of these samples at atmospheric temperature, no significant discoloration or polymer formation is evident.

While the preceding examples have illustrated specific embodiments of this invention, obviously substantial variation is possible without departing from the scope thereof. For example, the quantity of the dipyridyl derivative used to inhibit the polymerization of the unsaturated nitrile can be varied widely, depending upon the particular nitrile to be stabilized and the degree of inhibition desired. In general, minor amounts of the dipyridyl derivatives are used. An advantage of these dipyridyl derivatives in such an application as this is the fact that they can be used in extremely small quantities due to their strong inhibitory qualities. Concentrations in the range of from about 0.5 to about 1000 parts by weight of the dipyridyl derivative per million parts of the nitrile are highly preferred. These low concentrations afford adequate stability for most applications and greatly simplify subsequent separation of the inhibitor from the nitrile, if separation is required for further use of the nitrile. Of course, higher concentrations of the inhibitor in the nitrile can be used if desired, resulting in a nitrile monomer even more strongly inhibited against polymerization.

The dipyridyl derivatives can be used to stabilize unsaturated nitriles under any types of conditions. Thus, they can be used to inhibit polymer formation in unsaturated nitriles during storage under atmospheric conditions of light, air, temperature and pressure and during purification of the crude nitrile monomer. To inhibit polymer formation during distillation of the unsaturated nitrile, the inhibitor can be added to the feed stream to the column or introduced separately at some point in the distillation column. Preferably, the dipyridyl derivative is introduced at the top of the column to provide maximum inhibition throughout the entire system.

Any dipyridyl derivative having the formula

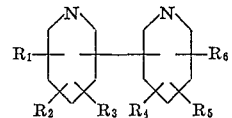

wherein $R_1$, $R_2$, $R_3$, $R_4$, $R_5$, and $R_6$ are selected from the group consisting of hydrogen and alkyl radicals containing from 1 to 8 carbon atoms, can be used to prepare the inhibited unsaturated nitriles of this invention. The R's shown in the structual formula can be the same or different from one another. Methyl, ethyl, propyl, isopropyl, butyl, sec.-butyl, pentyl, hexyl, 2-methylpentyl, heptyl, octyl, capryl, 2-ethylhexyl, etc., illustrate some of the alkyl radicals which can be substituted on the individual pyridine rings of the inhibitors used in this invention.

The alpha, beta-unsaturated nitriles, represented by the formula

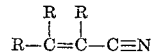

wherein the R's are the same or different and selected from the group consisting of hydrogen and alkyl radicals containing from 1 to 8 carbon atoms, respond readily to the stabilizing effect of the inhibitors disclosed herein. Acrylonitrile, alpha-substituted acrylonitrile wherein the substituent on the alpha carbon atom is an alkyl radical containing from 1 to 8 carbon atoms, and beta-substituted acrylonitriles where the substituent on the beta carbon atom is an alkyl radical containing from 1 to 8 carbon atoms, represent a class of monomers which polymerize very readily, but can be most effectively inhibited against polymerization by means of the dipyridyl derivatives.

When desired, separation of the dipyridyl derivative from the stabilized unsaturated nitrile monomer can be accomplished by any of a variety of simple techniques. For example, it can be extracted by means of a suitable solvent. Preferably, however, the unsaturated nitrile is distilled from the inhibited composition.

What is claimed is:

1. A composition comprising an unsaturated nitrile containing a minor amount of a compound having the formula

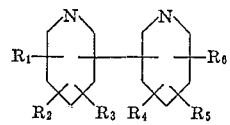

wherein $R_1$, $R_2$, $R_3$, $R_4$, $R_5$, and $R_6$ are selected from the group consisting of hydrogen and alkyl radicals containing from 1 to 8 carbon atoms.

2. A composition comprising an alpha-beta-unsaturated nitrile containing a minor amount of a compound having the formula

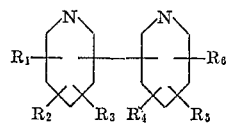

wherein $R_1$, $R_2$, $R_3$, $R_4$, $R_5$, and $R_6$ are selected from the group consisting of hydrogen and alkyl radicals containing from 1 to 8 carbon atoms.

3. A composition comprising a nitrile selected from the group consisting of acrylonitrile, the alpha-substituted acrylonitriles wherein the substituent on the alpha carbon atom is an alkyl radical containing from 1 to 8 carbon atoms, and the beta-substituted acrylonitriles wherein the substituent on the beta carbon atom is an alkyl radical containing from 1 to 8 carbon atoms, containing a minor amount of a compound having the formula

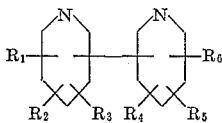

wherein $R_1$, $R_2$, $R_3$, $R_4$, $R_5$, and $R_6$ are selected from the group consisting of hydrogen and alkyl radicals containing from 1 to 8 carbon atoms.

4. A composition comprising a nitrile selected from the group consisting of acrylonitrile, the alpha-substituted acrylonitriles wherein the substituent on the alpha carbon atom is an alkyl radical containing from 1 to 8 carbon atoms, and the beta-substituted acrylonitriles where the substituent on the beta carbon atom is an alkyl radical containing from 1 to 8 carbon atoms, containing a compound having the formula

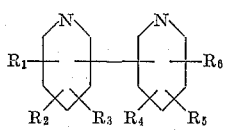

wherein $R_1$, $R_2$, $R_3$, $R_4$, $R_5$, and $R_6$ are selected from the group consisting of hydrogen and alkyl radicals containing from 1 to 8 carbon atoms, in the amount of from about 0.5 to about 1000 parts by weight per million parts by weight of nitrile.

5. A composition comprising acrylonitrile containing a compound having the formula

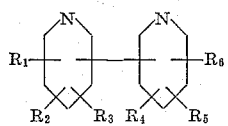

wherein $R_1$, $R_2$, $R_3$, $R_4$, $R_5$, and $R_6$ are selected from the group consisting of hydrogen and alkyl radicals containing from 1 to 8 carbon atoms, in the amount of from about 0.5 to about 1000 parts by weight per million parts by weight of acrylonitrile.

6. A composition comprising acrylonitrile and from about 0.5 to about 1000 parts by weight of dipyridyl per million parts of acrylonitrile.

7. A composition comprising acrylonitrile and from about 0.5 to about 1000 parts by weight of $\alpha,\alpha'$-dipyridyl per million parts of acrylonitrile.

8. A process for inhibiting the polymerization of unsaturated nitriles which comprises mixing therewith a minor amount of a compound having the formula

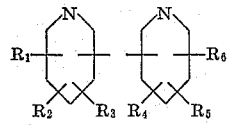

wherein $R_1$, $R_2$, $R_3$, $R_4$, $R_5$, and $R_6$ are selected from the group consisting of hydrogen and alkyl radicals containing from 1 to 8 carbon atoms.

9. A process for inhibiting the polymerization of alpha, beta-unsaturated nitriles which comprises mixing therewith a minor amount of a compound having the formula

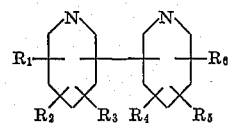

wherein $R_1$, $R_2$, $R_3$, $R_4$, $R_5$, and $R_6$ are selected from the group consisting of hydrogen and alkyl radicals containing from 1 to 8 carbon atoms.

10. A process for inhibiting the polymerization of a nitrile selected from the group consisting of acrylonitrile, the alpha-substituted acrylonitriles wherein the substituent on the alpha carbon atom is an alkyl radical containing from 1 to 8 carbon atoms, and the beta-substituted acrylonitrile wherein the substituent on the beta carbon atom is an alkyl radical containing from 1 to 8 carbon atoms which comprises mixing therewith a minor amount of a compound having the formula

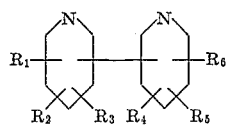

wherein $R_1$, $R_2$, $R_3$, $R_4$, $R_5$, and $R_6$ are selected from the group consisting of hydrogen and alkyl radicals containing from 1 to 8 carbon atoms.

11. A process for inhibiting the polymerization of a nitrile selected from the group consisting of acrylonitrile, the alpha-substituted acrylonitriles wherein the substituent on the alpha carbon atom is an alkyl radical containing from 1 to 8 carbon atoms, and the beta-substituted acrylonitrile wherein the substituent on the beta carbon atom is an alkyl radical containing from 1 to 8 carbon atoms which comprises mixing therewith a compound having the formula

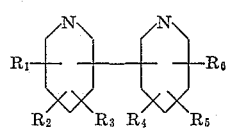

wherein $R_1$, $R_2$, $R_3$, $R_4$, $R_5$, and $R_6$ are selected from the group consisting of hydrogen and alkyl radicals containing from 1 to 8 carbon atoms in the amount of from about 0.5 to about 1000 parts by weight per million parts by weight of nitrile.

12. A process for inhibiting the polymerization of acrylonitrile which comprises mixing therewith a compound having the formula

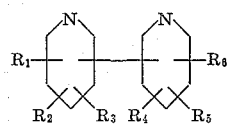

wherein $R_1$, $R_2$, $R_3$, $R_4$, $R_5$, and $R_6$ are selected from the group consisting of hydrogen and alkyl radicals containing from 1 to 8 carbon atoms, in the amount of from about 0.5 to about 1000 parts by weight per million parts by weight of acrylonitrile.

13. A process for inhibiting the polymerization of acrylonitrile which comprises mixing therewith dipyridyl in the amount of from about 0.5 to about 1000 parts by weight per million parts by weight of acrylonitrile.

14. A process for inhibiting the polymerization of acrylonitrile which comprises mixing therewith $\alpha,\alpha'$-dipyridyl in the amount of from about 0.5 to about 1000 parts by weight per million parts by weight of acrylonitrile.

References Cited in the file of this patent

UNITED STATES PATENTS

| Number | Name | Date |
|---|---|---|
| 2,375,015 | Marple et al. | May 1, 1945 |

OTHER REFERENCES

Karrer: "Organic Chem." (Elsevier 2nd Eng. Ed.), p. 784 (1946).

Fieser et al.: "Organic Chem." (Heath, 2nd Ed.), p. 856 (1950).